United States Patent
Berning et al.

(10) Patent No.: US 8,974,006 B2
(45) Date of Patent: *Mar. 10, 2015

(54) SELF-PROPELLED CIVIL ENGINEERING MACHINE AND IN PARTICULAR A ROAD-MILLING MACHINE, ROAD RECYCLER OR ROAD STABILIZER

(75) Inventors: Christian Berning, Zülpich (DE); Dieter Simons, Buchholz (DE); Peter Busley, Linz/Rhein (DE)

(73) Assignee: Wirtgen GmbH (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/118,742

(22) Filed: May 31, 2011

(65) Prior Publication Data

US 2011/0227393 A1 Sep. 22, 2011

Related U.S. Application Data

(63) Continuation of application No. 12/104,293, filed on Apr. 16, 2008, now Pat. No. 7,976,106.

(30) Foreign Application Priority Data

Apr. 20, 2007 (DE) .......................... 10 2007 019 202

(51) Int. Cl.
*E01C 23/088* (2006.01)
*E01C 21/00* (2006.01)
*B60K 25/02* (2006.01)

(52) U.S. Cl.
CPC .............. *E01C 23/088* (2013.01); *E01C 21/00* (2013.01); *B60K 25/02* (2013.01)
USPC ....................................................... 299/39.4

(58) Field of Classification Search
USPC ........... 299/39.1, 39.4; 404/90, 93–94; 477/2, 477/6; 74/665 B; 123/DIG. 8
See application file for complete search history.

(56) References Cited

U.S. PATENT DOCUMENTS 2,173,541 A * 9/1939 Rieger et al. ...................... 92/68
3,474,876 A 10/1969 Magnier
(Continued)

FOREIGN PATENT DOCUMENTS

DE 1630980 10/1971
DE 102004046467 A1 4/2006
(Continued)

OTHER PUBLICATIONS

EPO Office Action, EP 08005940, dated Nov. 3, 2011, 7 pages.
(Continued)

*Primary Examiner* — Sunil Singh
(74) *Attorney, Agent, or Firm* — Patterson Intellectual Property Law, PC; Lucian Wayne Beavers

(57) ABSTRACT

The invention relates to a self-propelled civil engineering machine, in particular a road-milling machine, a road recycler, or a road stabilizer, having a frame carried by a set of running gear, a working unit for performing work required for the civil engineering operation, and in particular a working drum, and a drive unit carried by the frame of the machine, to drive the working drum. A power transmitter is used to transmit the driving power from the drive unit to the working unit. The drive unit of the self-propelled civil engineering machine has a first and a second drive engine, the power transmitter being so designed that the driving powers coming from the first and the second drive engines can be transmitted to the working unit together. With the design of drive according to the invention, a particularly space-saving construction is obtained for the drive and this allows the power of the drive unit to be increased without having to exceed the present width for transport of the self-propelled civil engineering machine.

14 Claims, 5 Drawing Sheets

(56) References Cited

U.S. PATENT DOCUMENTS

| | | | |
|---|---|---|---|
| 3,948,049 A | 4/1976 | Ohms et al. | |
| 4,193,636 A * | 3/1980 | Jakob | 299/39.2 |
| 4,480,612 A | 11/1984 | Yamakawa | |
| 4,714,374 A * | 12/1987 | Mihara | 404/91 |
| 5,063,713 A * | 11/1991 | Buchheit, Jr. | 451/344 |
| 5,229,676 A * | 7/1993 | Bood | 310/114 |
| 5,676,490 A * | 10/1997 | Nelson | 404/94 |
| 7,976,106 B2 * | 7/2011 | Berning et al. | 299/39.4 |
| 8,432,065 B2 * | 4/2013 | Reinkens | 307/87 |
| 2002/0084120 A1 | 7/2002 | Beasley | |
| 2004/0005190 A1 | 1/2004 | Jakits | |
| 2006/0086076 A1 | 4/2006 | Krone et al. | |
| 2007/0191179 A1 | 8/2007 | Hugenroth et al. | |
| 2009/0051210 A1 | 2/2009 | Busley et al. | |
| 2011/0095594 A1 | 4/2011 | Busley et al. | |

FOREIGN PATENT DOCUMENTS

| | | | |
|---|---|---|---|
| DE | 102005017754 A1 | 10/2006 | |
| EP | 1818524 A1 | 8/2007 | |
| JP | 2005171559 A | 6/2005 | |
| WO | 8201915 A1 | 6/1982 | |
| WO | 9504191 A1 | 2/1995 | |
| WO | 2006108757 A1 | 10/2006 | |

OTHER PUBLICATIONS

Exhibit A: Printout from Internet website www.askarchie.co.uk discussing the Bosch AXT 25 TC Quiet Shredder.

Exhibit B: Printout from Internet website www.abidstudio.com discussing the Cuisinart HFP-300 "PrepExpress" Handheld Food Processor, Apr. 18, 2007.

Exhibit C: Printout from Internet website www.amcomt.en.busytrade.com discussing the Xi'an Amco Machine Tool Co. Ltd. Drum and Disc Brake Cutting Machine.

Exhibit D: Printout from Internet website www.micronengineers.com discussing their Micron Engineers (India) N.C. Cut-Off Product.

Exhibit E: Printout from Internet website www.zc77.de discussing the Caran d'Arche Pencil Sharpener.

* cited by examiner

SELF-PROPELLED CIVIL ENGINEERING MACHINE AND IN PARTICULAR A ROAD-MILLING MACHINE, ROAD RECYCLER OR ROAD STABILIZER

BACKGROUND OF THE INVENTION

Field of the Invention

The invention relates to a self-propelled civil engineering machine which has a working unit for performing work required for the civil engineering operation. The invention relates in particular to a road-milling machine, a road recycler or a road stabilizer.

Self-propelled civil engineering machines of different designs are used in road-building. These include the known road-milling machines, road recyclers or road stabilizers. Existing layers of the surfacing structure of roads can be removed with the known road-milling machines and existing road surfacings can be reconditioned with the known road recyclers. The known road stabilizers are used to prepare the foundation structure for the building of roads.

Self-propelled civil engineering machines of this kind have a working unit which is a working drum and in particular a milling drum fitted with milling cutters. The working drum is driven by a drive unit. A power transmitting unit is used to transmit the driving power from the drive unit to the working unit.

DE 10 2005 017 754 A1 describes a self-propelled civil engineering machine and in particular a road-milling machine, road recycler or road stabilizer. The drive unit of the known civil engineering machine has an internal combustion engine which drives the working drum by means of a transmission employing tractive means and in particular a belt transmission. The civil engineering machine makes provision for the drive train to be divided into two groups, with one group including the internal combustion engine, which is mounted in a relatively yielding way on the frame of the machine, as a result of which the vibration transmitted to the frame of the machine is heavily damped, and with the other group, which includes the working drum, being mounted almost rigidly on the frame of the machine with greater strength, as a result of which higher forces are supported and higher powers can thus be transmitted.

DE 10 2005 017 754 A1 makes explicit mention of the fact that, when efforts are made to increase performance, the space required for the drive engine increases but the engine has to be accommodated within the fixed preset width laid down for transport of the civil engineering machine. If the preset width for transport were exceeded, the result would be that the civil engineering machine could only be transported by special consent. Hence, because of this restriction, limits are set to the power that is available from the drive unit of the civil engineering machine.

The invention provides a civil engineering machine which has a working unit for performing work required for the civil engineering operation and which, without exceeding the fixed preset width for transport, has a drive unit which is of a power higher than that of known civil engineering machines.

Accordingly, the invention provides a self-propelled civil engineering machine, in particular a road-milling machine, a road recycler, or a road stabilizer, having a frame carried by a set of running gear,
a working unit for performing work required for the civil engineering operation,
a drive unit carried by the frame of the machine, to drive the working unit, and
a power transmitter for transmitting the driving power from the drive unit to the working unit,
wherein the drive unit has a first drive engine and a second drive engine, the power transmitter being so designed that the driving powers coming from the first and the second drive engines can be transmitted to the working unit simultaneously.

Even though what are specified in this connection are a first and a second drive engine, the drive unit may also have further drive engines, with the driving power coming from all the engines being able to be transmitted to the working unit simultaneously. In practice however, a drive unit having "only" a first and a second drive engine is adequate.

With regard to the special requirements which self-propelled civil engineering machines have to meet and to the arrangement of the individual sub-assemblies of the civil engineering machine which results from these requirements, it has been found that the use of two, or even more than two, drive engines of lower power rather than one drive engine of higher power produces considerable advantages for the civil engineering machine and in particular for the road-milling machine, road recycler or road stabilizer.

The use of two drive engines of lower power rather than one drive engine of higher power produces a considerably more compact construction for the drive unit, which is the only thing that makes it possible for a drive to be used which is of considerably higher power than in known civil engineering machines. Hitherto, drive units of such high power have not been used on civil engineering machines, and in particular on road-milling machines, road recyclers or road stabilizers, due to the fixed present width for transport of the machine. A drive unit of higher power would have made it necessary for the maximum width for transport to be exceeded, and this would have called for special consent if the civil engineering machine were to be transported.

As well as the increase in power, the multi-engined drive unit also gives the following advantages.

Commercially available engines of relatively low power, which are generally cheaper than larger engines of higher power, can be used as the drive engines.

Nor does the use of another engine make the maintenance of the civil engineering machine more difficult in comparison with civil engineering machines of low power, because, relative to a single drive engine, the civil engineering machine according to the invention of higher power, which has two drive engines, requires the same maintenance work, or even spares, as a civil engineering machine of lower power which has only one such drive engine.

Also, advantages for the optimization of the engines, in particular the internal combustion engines, in respect of fuel consumption and pollutant emission, may result in the case of the multi-engined drive unit. On the one hand, two engines of lower power can possibly be operated with a lower fuel consumption and a lower pollutant emission than one engine of higher power. On the other hand, in the event of the whole of the power not being required, e.g. when the depths of milling are small and in shunted operation or when the machine is being changed over, part-load operation is possible with only one, smaller engine of lower power, which has lower fuel consumption and lower pollutant emission.

Basically, it is immaterial for the purposes of the invention what form the working unit takes so long as the said working unit has the working means which can be used to carry out work which is required for the civil engineering operation. If the civil engineering machine is a road-milling machine, a road recycler or a road stabilizer, the working unit has a working drum and in particular a milling drum fitted with milling cutters.

In a preferred embodiment of the civil engineering machine according to the invention, the power transmitter for transmitting the driving power from the drive unit to the working unit has a first unit for connecting/disconnecting the torque coming from the first drive engine and a second unit for connecting/disconnecting the torque coming from the second drive engine, such for example as a first and a second engageable/disengageable clutch. This makes it possible for one drive engine to be operated as a main engine and the other drive engine to be operated as an additional engine. The second drive engine may for example be switched on only when the high power is required. Basically, it is however also possible for both drive engines only to be capable of being run simultaneously. Then, one of the two engageable/disengageable clutches may also be dispensed with. The possibility should however always exist of the drive unit being disconnected from the working unit.

A particularly preferred embodiment of the civil engineering machine makes provision for the first and second drive engines to be arranged in the frame of the civil engineering machine transversely to its direction of travel. An arrangement of this kind for the drive engines has the advantage that the power transmitting unit for transmitting power from the drive unit to the working unit, the drive shaft of which working unit likewise extends transversely to the direction of travel in the known road-milling machines, road recyclers or road stabilizers, may be relatively simple in construction.

Given that the overall width of the machine is limited in the light of the preset arrangement of the individual sub-assemblies, the drive unit of the civil engineering machine according to the invention allows an increase in power without any extensive, and in particular costly, changes being required to the design of the civil engineering machine.

Another particularly preferred embodiment makes provision for the first and second drive engines to be arranged with a spacing from one another, but next to one another and as close as possible together, or even one above the other and close together. When situated next to one another the engines may be arranged in a plane which lies above the plane in which the working unit is arranged on the frame of the machine. Given the preset width for transport, a particularly space-saving arrangement of the individual sub-assemblies is thereby achieved. When situated one above the other, the engines may also be arranged ahead of or behind the working unit in the direction of travel.

The drive engines are preferably internal combustion engines and in particular diesel engines. Both engines are preferably of the same power, which means that it is possible for power to be doubled when both engines are running simultaneously. Basically however it is also possible for the power of one of the two engines to be higher than that of the other engine.

The drive engines are also preferably engines of the same design even though they may differ from one another in power. This simplifies the procurement of spare parts and the maintenance of the engines. The engines are preferably identical engines which differ from one another neither in design nor power.

As well as the working unit, the drive unit may also drive other sub-assemblies of the civil engineering machine which, in the case of road-milling machines, road recyclers or road stabilizers, include for example sub-assemblies for vertical adjustment, the steering and the water pump. These however are loads which require considerably less power than driving the working drum does. These sub-assemblies are preferably driven by means of hydraulic pumps.

The means for driving the hydraulic pumps for the ancillary sub-assemblies are preferably coupled to the first drive engine, which constitutes the main engine. The drive for the hydraulic pumps for the ancillary sub-assemblies preferably has a pump distribution gearbox.

The power transmitter for transmitting power from the drive unit to the working unit may take different forms. Basically, any suitable means by which the two driving powers can be added together may be used.

In a particularly preferred embodiment, the power transmitter has a transmission employing traction which is preferably a belt transmission. The transmission employing traction may however equally well be a chain drive.

The belt transmission preferably has a first belt pulley which is connected to be solid in rotation therewith to an output shaft able to be driven by the first drive engine, and a second belt pulley which is connected to be solid in rotation therewith to an output shaft able to be driven by the second drive engine, and a third belt pulley which is connected to be solid in rotation therewith to a drive shaft driving the working unit. Over the belt pulleys runs at least one drive belt, as a result of which the drive shaft of the working unit is driven by the output shafts of both the engines.

The multi-engined drive unit of the civil engineering machine according to the invention preferably makes provision for the first and second output shafts to be coupled via first and second hinging couplers to the first and second drive engines respectively. Basically, it is however equally possible for only one of the two drive engines to be coupled to the drive shaft via a hinging coupler. The provision mentioned gives the advantage that the drive engine can be mounted in a considerably more yielding way than the way in which the other parts of the drive train are mounted, which should be fastened to the frame of the machine as stiffly as possible. The hinging coupler may be rigid in rotation, being for example a universally jointed shaft, or elastic in rotation, being for example an elastomeric coupling.

In the embodiment having the belt transmission, the unit for connecting/disconnecting the torques coming from the first and second drive engines is preferably arranged between the drive engines and the first and second output shafts respectively. The unit for driving at least one hydraulic pump is preferably also arranged between the drive engine and the output shaft. Basically, it is possible in this case for the unit for driving the hydraulic pump to be arranged between the drive engine and the engageable/disengageable clutch or for the engageable/disengageable clutch to be arranged between the drive engine and the unit for driving the hydraulic pumps.

An alternative embodiment of the invention makes provision for the power transmitting means to have a spur-gear gearbox by which the driving powers coming from the first and second drive engines, or even from further engines, can be transmitted to the working unit.

Because of their principle, internal combustion engines in general do not produce a uniform rotary movement. The rotation at the output always has rotary oscillations superimposed on it. What is more, vibrations are also transmitted into the frame of the machine via the coupling means. In internal combustion engines, and particularly in the more recent generation of diesel engines, which are notable for their lightweight construction, oscillations and vibrations of this kind occur to a more pronounced extent if there are changes to the flash point and the injection point to meet the exhaust gas regulations which apply. The rotary oscillations may result in the working lives of, for example, the transmissions or clutches in the output train being shorter due to wear and fatigue of the material. The other vibrations, unless they are absorbed by the elastic coupling means, cause a reduction in comfort by for example being radiated in the form of sound.

The drive unit of the civil engineering machine according to the invention having a first and second internal combustion engine, and in particular diesel engines of lightweight construction, also has advantages with regard to these vibrations and oscillations. In a preferred embodiment of the drive unit, the crankshaft angle of the crankshaft of the first internal combustion engine can be set relative to the crankshaft angle of the crankshaft of the second internal combustion engine, when the two internal combustion engines are running, in such a way that the rotary oscillations produced by the two internal combustion engines at least partly cancel each other out when the driving powers coming from the first and second internal combustion engines are being transmitted together. The vibrations which are transmitted into the frame of the machine can also be reduced by this means.

BRIEF DESCRIPTION OF THE DRAWINGS

In what follows, two embodiments of the invention will be explained in detail by reference to the drawings.

In the drawings.

DETAILED DESCRIPTION

Figure 1:
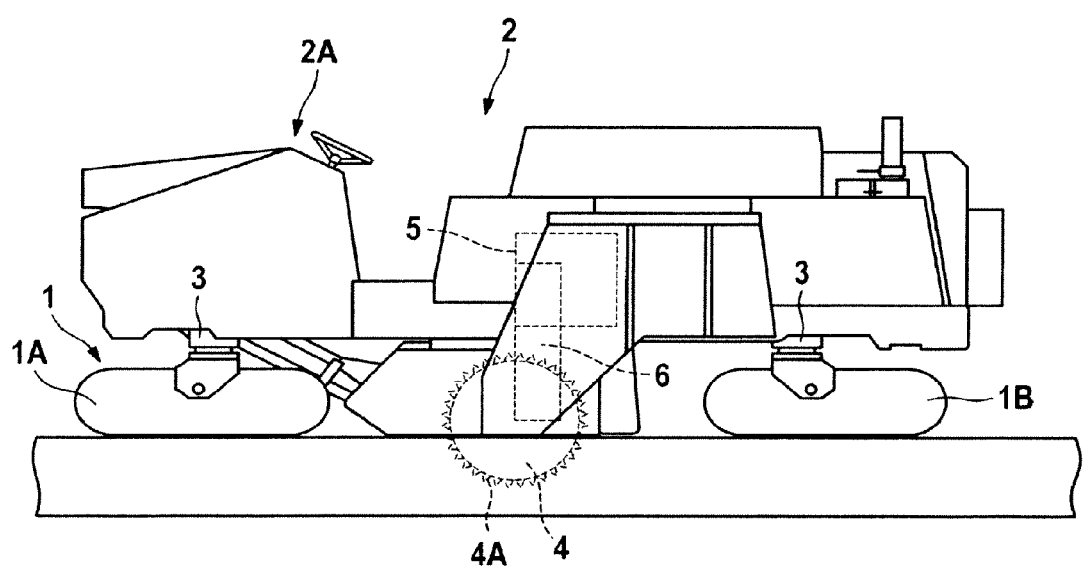
FIG. 1 is a side view of a large road-milling machine which serves as an example of a self-propelled civil engineering machine.

FIG. 1 shows, as an example of a self-propelled civil engineering machine, a so-called large road-milling machine for milling away road surfacings of asphalt, concrete or the like. The large road-milling machine has a frame 2 which is carried by running gear 1 and which has a driver's position 2A. The running gear 1 of the road-milling machine comprises for example four track-laying units 1A, 1B which are arranged at the front and rear ends on the two sides of the frame of the vehicle. The track-laying units, which allow the large road-milling machine to move backwards and forwards along a road lane, are fastened to lifting columns 3, which are mounted on the frame 2 of the machine, in such a way as to be vertically adjustable, thus enabling the frame of the machine to be positioned in a desired attitude. It goes without saying that wheels may also be provided in place of the track-laying units.

The road-milling machine has a working unit which is a milling device having a milling drum 4 which is fitted with milling cutters 4A. The milling drum 4 is arranged on the frame 1 of the machine between the front and rear track-laying units 1A, 1B. The road surfacing is milled away by the milling drum 4. To drive the milling drum, the road-milling machine has a drive unit 5 which is carried by the frame 2 of the machine and which is shown in broken lines in FIG. 1. The drive unit 5 is arranged on the frame 1 of the machine, between the front and rear track-laying units 1A, 1B, in a plane which lies above the plane in which the milling drum 4 is situated.

As well as the milling drum 4, the drive unit 5 also drives the track-laying units 1A, 1B and other sub-assemblies of the road-milling machine, which include for example the lifting columns 3 for adjusting the frame 2 of the machine vertically, or positioners (not shown) for steering, or a water pump (not shown) for cooling the milling cutters 4A of the milling drum 4.

To transmit the driving power from the drive unit 5 to the milling drum 4, use is made of a power transmitting means 6, which is merely indicated in FIG. 1 in broken lines.

The construction and operation of the drive unit 5, working unit 4 and power transmitter 6 of the civil engineering machine will be explained in detail below by reference to FIGS. 2 to 6 and to two embodiments.

Figure 2:
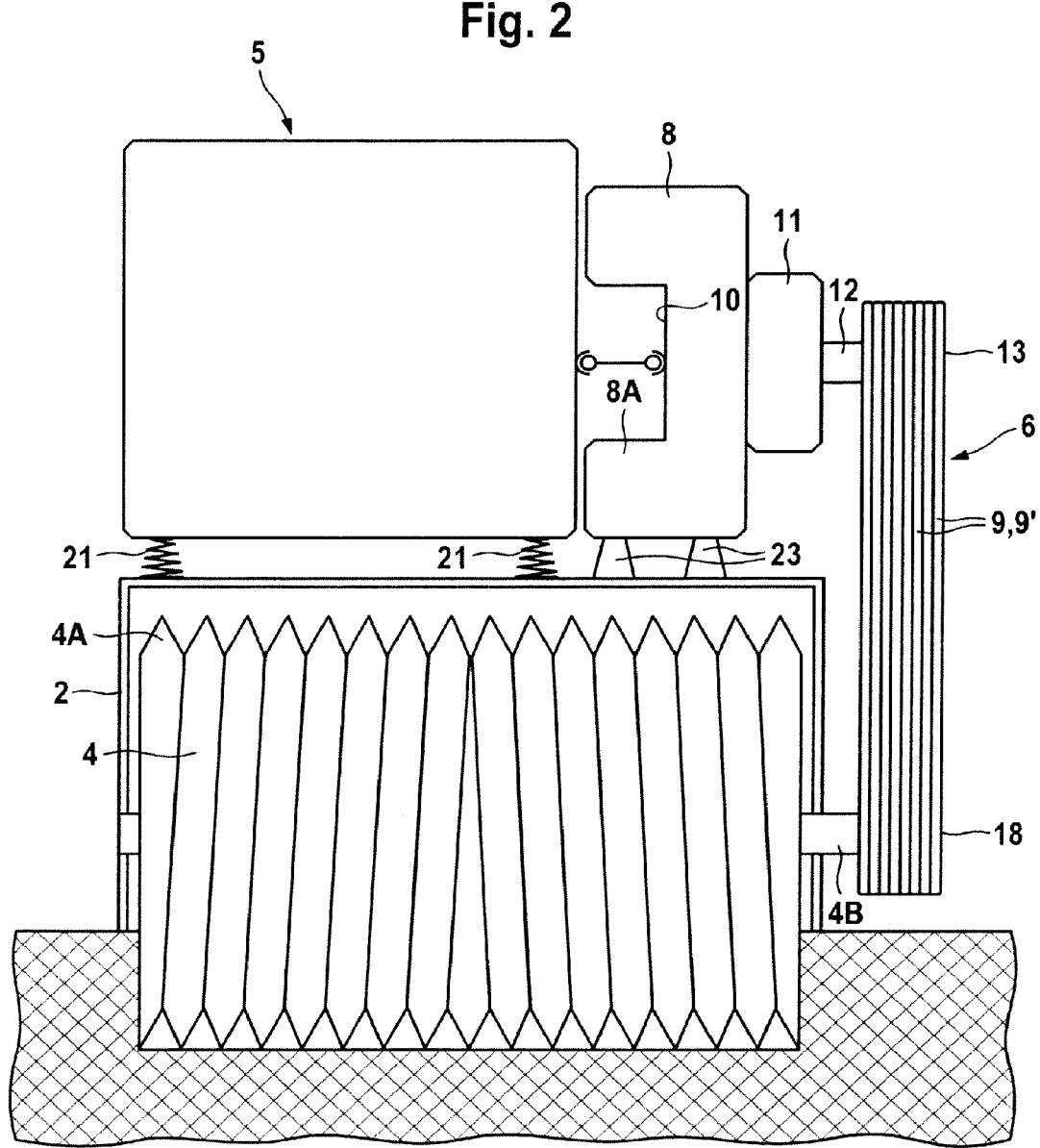
FIG. 2 is a simplified schematic view in section taken through the drive unit and working unit of the self-propelled civil engineering machine together with its power transmitter.

FIG. 2 shows that the milling drum, which is fitted with milling cutters 4A, is arranged in the frame 2 of the machine transversely to the direction of travel. The milling drum 4 has a drive shaft 4B which is mounted on the frame 2 of the machine and which extends transversely to the direction of travel. The drive shaft may also be mounted in a drum housing, which is connected in turn to the frame of the machine.

Figure 3:
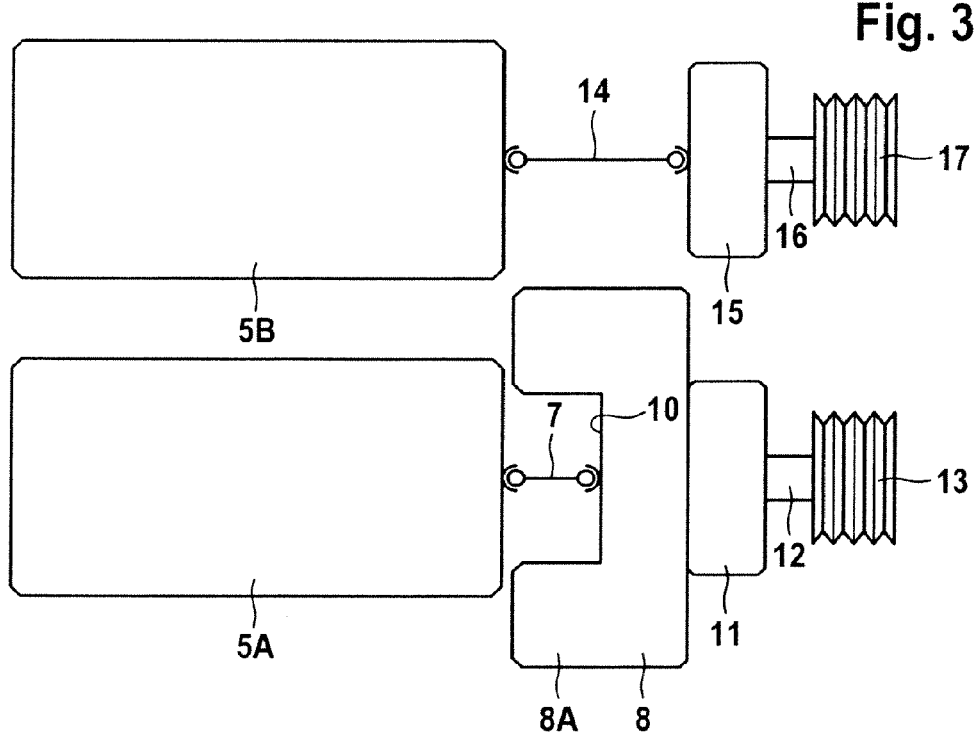
FIG. 3 is a plan view of the layout of the drive unit, working unit and power transmitter of a first embodiment of self-propelled civil engineering machine as shown in FIG. 2.
Figure 4:
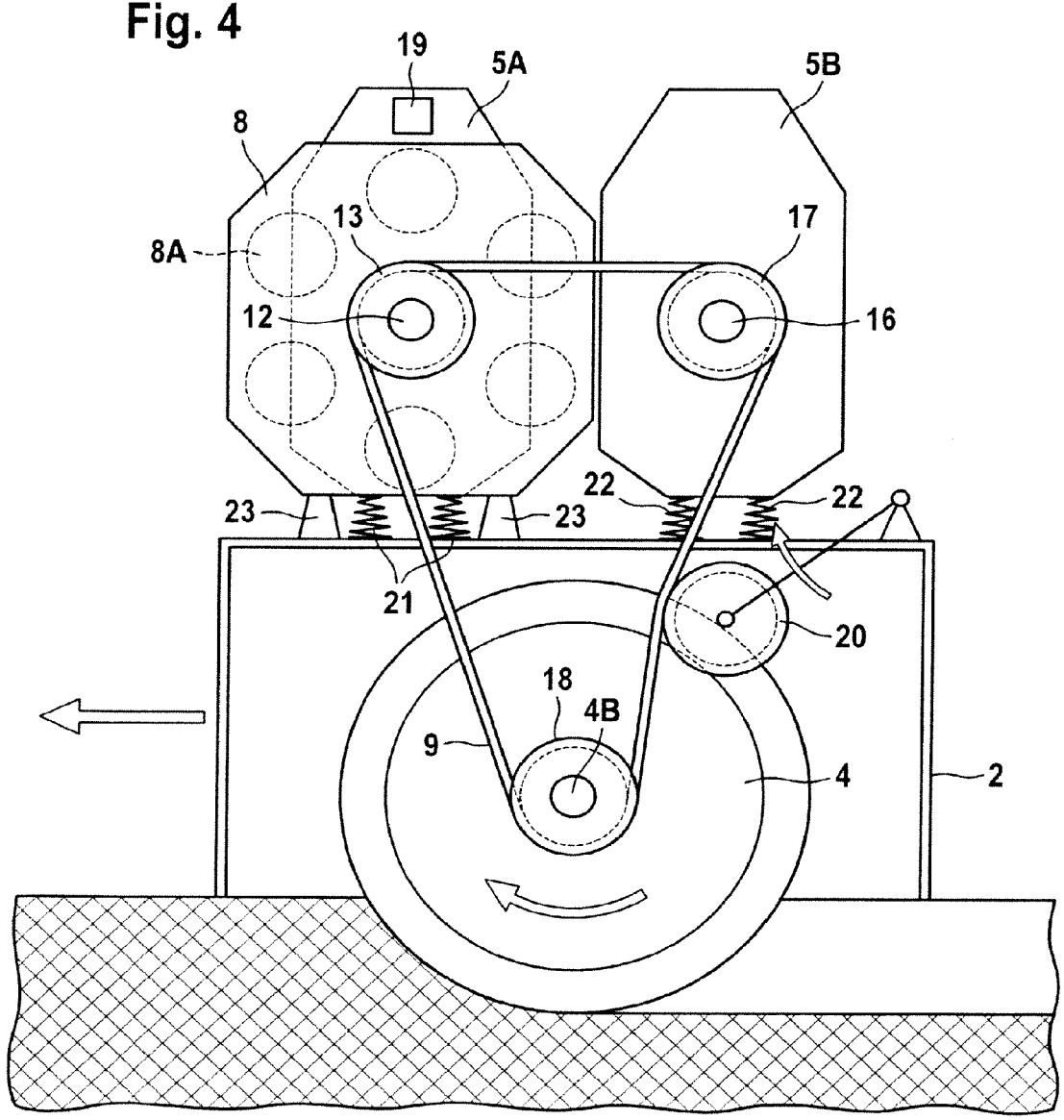
FIG. 4 is a side view of the drive unit, working unit and power transmitter of the civil engineering machine as shown in FIG. 2.

The drive unit 5 for driving the milling drum 4 comprises a first and a second internal combustion engine 5A, 5B, and in particular two diesel engines (FIG. 3, FIG. 4). In the present embodiment, these diesel engines are identical engines. The two diesel engines may however also be engines of different designs and/or powers.

The first engine, which will be referred to below as the main engine 5A, is coupled via a hinging coupling 7, such for example as a universally jointed shaft or an elastomeric coupling, to a pumps distribution gearbox 8 (FIG. 3). Arranged inside the pump distribution gearbox 8 is a spur-gear gearbox which drives a plurality of hydraulic pumps 8A in unison, which hydraulic pumps 8A are so arranged as to be distributed circumferentially. Because of the layout of the hydraulic pumps 8A, a free central interior space 10 is obtained between the hydraulic pumps 8A, in which the coupling 7 is situated. A particularly space-saving layout is achieved in this way for the components, which means that, in view of the preset width for transport of the civil engineering machine, enough space is available for the transversely installed engine.

The pump distribution gearbox 8 is coupled, via a means 11 for connecting/disconnecting the torque, such for example as an engageable/disengageable clutch, to a drive shaft 12, on which a belt pulley 13 is mounted to be solid in rotation therewith.

The second engine, which will be referred to below as the ancillary engine 5B, is arranged transversely to the direction of travel at a close spacing from the main engine 5A (FIG. 3). The ancillary engine 5B is coupled, via a further hinging coupling 14, such for example as a universally jointed shaft or an elastomeric coupling, to a second connector 15 for connecting/disconnecting the torque such for example as an engageable/disengageable clutch, to which in turn is coupled a drive shaft 16 on which is mounted a second belt pulley 17.

It is also possible for the pump distribution gearbox 8 to be associated not with the main engine 5A but with the ancillary engine 5B. It is likewise possible for the pump distribution gearbox 8 not to be coupled directly to the main engine and for the engageable/disengageable clutch 11 not to be coupled to the pump distribution gearbox but for the engageable/ disengageable clutch 11 to be coupled directly to the main engine and the pump distribution gearbox to be coupled to the engageable/disengageable clutch. The open space 10 in the pump distribution gearbox 8 can then receive the engageable/disengageable clutch 11 rather than the coupling means 7. What is obtained in both cases is a compact construction.

Solidly mounted on the drive shaft 4B of the milling drum 4 is a further belt pulley 18. A plurality of drive belts 9, which are tensioned by a tensioning roller 20 which is hingeably fastened to the frame of the machine, run on the two belt pulleys 13 and 17 of the main and ancillary engines 5A and 5B and on the belt pulley 18 of the milling drum 4. The powers of the main and ancillary engines 5A, 5B are added together and transmitted to the milling drum by the belt transmission. The design of the drive allows the main and ancillary engines to be switched on/off as desired as a function of the power required. This produces a drive unit of compact construction and high power.

The hydraulic pumps 8A, which are driven by the pump distribution gearbox 8, are used to drive additional sub-assemblies, but ones which require considerably less power than is required to drive the milling drum.

The main and ancillary engines 5A, 5B are fastened to the frame 2 of the machine with the help of elastic spring/damping means 21 which are of low resilient stiffness, which means that the vibrations and oscillations which occur particularly in engines are transmitted to the least possible extent to the frame of the machine.

By contrast, the remaining part of the drive train, which includes the pump distribution gearbox 8 associated with the main engine 5A, is fastened to the frame 2 of the machine by spring/damping members 23 which are of high resilient stiffness or are of a rigid form.

The construction and operation of the coupling and spring/damping means are described in detail in DE 10 2005 017 754 A1, the disclosure of which is hereby incorporated by reference.

In what follows a description will be given by reference to FIGS. 2, 5 and 6 of an alternative embodiment, which differs from the embodiment which was described by reference to FIGS. 2, 3 and 4 in that the adding together of the powers of the two engines 5A, 5B is performed not by a belt transmission but by a spur-gear gearbox. Assemblies and parts which correspond to one another are identified by the same reference numerals.

The main engine 5A and ancillary engine 5B are connected together by a spur-gear gearbox 24 which may be incorporated in the pump distribution gearbox 8 of the main engine 5A. If this is the case, the spur-gear gearbox and the pump distribution gearbox form a gearbox unit. The spur-gear gearbox may have an engageable/disengageable clutch 15 which is incorporated in the gearbox unit. The coupling of the ancillary engine 5A to the spur-gear gearbox 24 is again performed by means of a coupling means 14' and in particular a universally jointed shaft or an elastomeric coupling.

Figure 6:
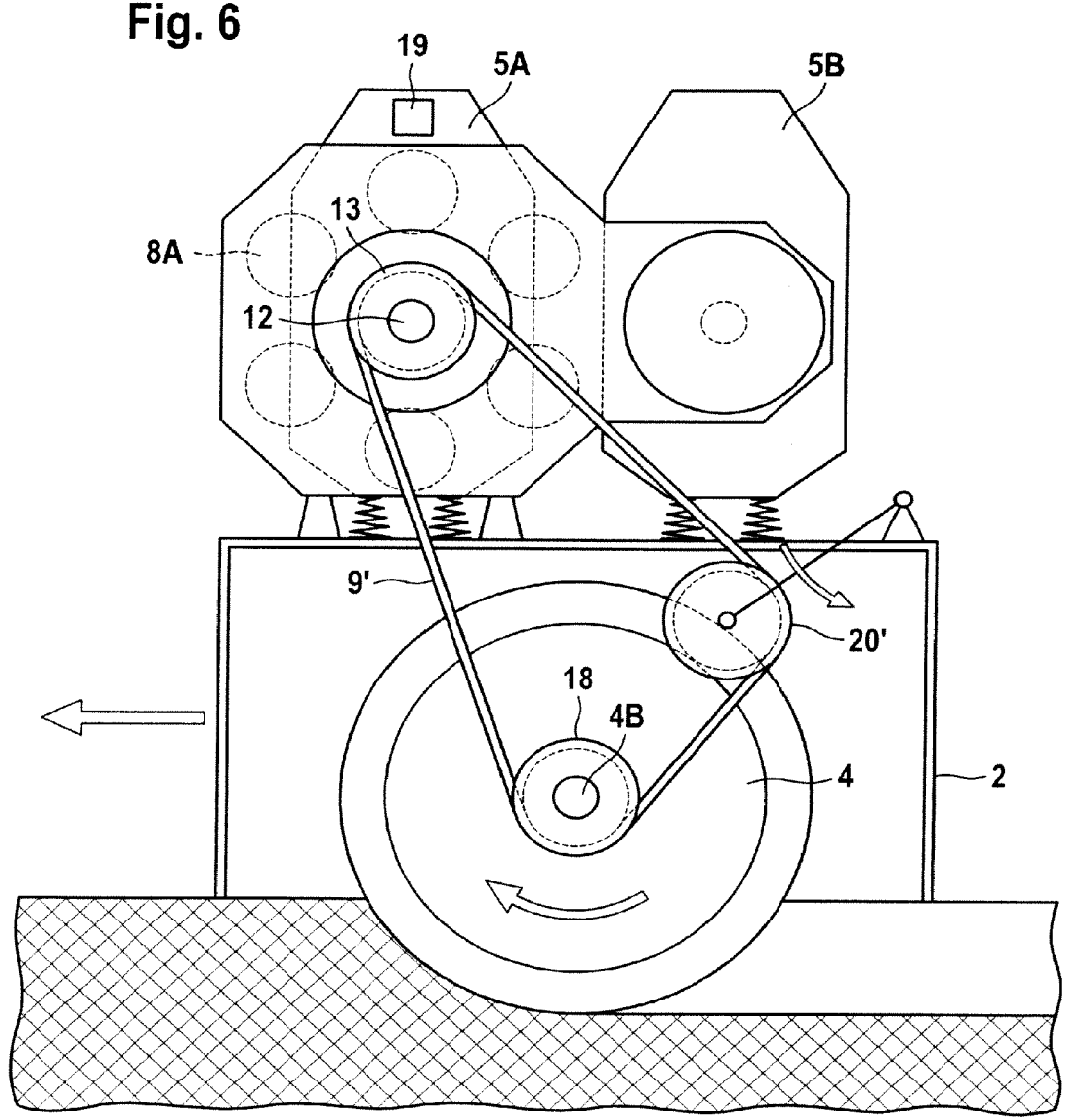
FIG. 6 is a side view of the drive unit, working unit and power transmitter of the civil engineering machine of FIG. 5.

FIG. 6 shows that the drive belts 9' run over the belt pulley 13 associated with the main engine 5A, the belt pulley 18 of the milling drum 4, and the tensioning roller 20', which in this embodiment has the drive belts 9' passing round it on the outside.

In place of the embodiments which have been described by reference to FIGS. 2 to 6, it is also possible for the two engines to be coupled together by a first transmission employing tractive means, so that the driving powers are added together, and for the power of both engines then to be transmitted to the working unit by a second transmission employing tractive means.

In this alternative embodiment, one belt pulley may be provided on the output shaft of one engine and two belt pulleys may be provided on the output shaft of the other engine, there being a first drive belt or a plurality of drive belts which run over the first of the two belt pulleys of the one engine and the belt pulley of the other engine. A second drive belt or a plurality of drive belts may run over the other of the two pulleys of the one drive engine and over the belt pulley of the working drum. Basically, it is immaterial in this case whether it is the one or the other engine which is the main or ancillary engine. This embodiment corresponds to the embodiment shown in FIGS. 5 and 6, although the two engines are coupled together not by a spur-gear gearbox but by at least one further drive belt.

The drive engines 5A, 5B of the drive unit of the civil engineering machine according to the invention are preferably diesel engines of lightweight construction, in which it is basically possible for rotary oscillations to occur.

In a preferred embodiment of the drive unit, the crankshaft angles of the crankshafts of the first and second internal combustion engines 5A, 5B, which are in particular diesel engines, can be set when the two internal combustion engines are running, thus enabling the crankshaft of the first engine to lead or trail the crankshaft of the second engine by a selectable angle.

Figure 5:
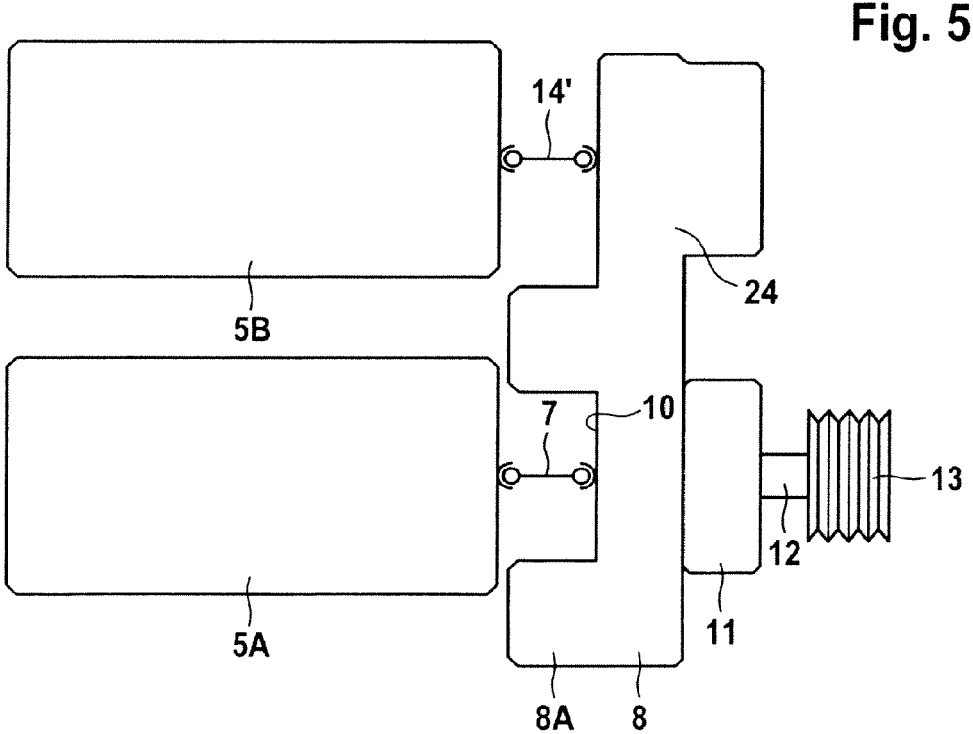
FIG. 5 is a simplified schematic view of the working unit, drive unit and power transmitter of a second embodiment of the self-propelled civil engineering machine shown in FIG. 2.

The drive unit 5 has a regulating unit 19 for reducing vibrations and oscillations which is shown schematically in FIGS. 4 and 5. The regulating unit 19 is so designed that the crankshaft angle of the crankshaft (not shown) of the first internal combustion engine 5A can be set relative to the crankshaft angle of the crankshaft (not shown) of the second internal combustion engine 5B in such a way that, when the driving powers coming from the first and second engines are transmitted together by the power transmitting means 6 to the working unit 4, the rotary oscillations produced by the two internal combustion engines at least partly cancel each other out. The first engine 5A is for example operated in such a way that its crankshaft leads by a certain angle, whereas the second engine 5B is operated in such a way that its crankshaft trails by a certain angle. The rotary oscillations attributable to the first and second engines, which are transmitted onto the drive train, are thus out-of-phase with one another by a certain phase angle. The regulating unit 19 sets the crankshaft angles in such a way that the rotary oscillations which are superimposed on one another in the drive train at least partly cancel each other out, i.e. oscillations of a given amplitude in one direction compensate for oscillations of a similarly great amplitude in the opposite direction. The same is true of other oscillations or vibrations which are transmitted into the frame of the machine.

What is claimed is:

1. A method of driving a working unit of a self-propelled civil engineering machine, the machine including:
    a frame having a direction of travel;
    a milling drum supported from the frame for working engagement with a ground surface, the milling drum having a drum axis;
    a first internal combustion drive engine arranged on the frame transversely to the direction of travel; and
    a second internal combustion drive engine arranged on the frame transversely to the direction of travel, the second internal combustion drive engine being substantially parallel to the first internal combustion drive engine and non-coaxial with the first internal combustion drive engine, the first and second engines being arranged next to one another in a plane located above the milling drum axis;

the method comprising:
(a) operating the first internal combustion drive engine to produce a first driving power;
(b) operating the second internal combustion drive engine to produce a second driving power; and
(c) adding together and transmitting the first and second driving powers to the milling drum with a belt drive system; and
(d) setting a crankshaft angle of the first engine relative to a crankshaft angle of the second engine and thereby at least partially cancelling rotary oscillations produced by the first engine with rotary oscillations produced by the second engine.

2. The method of claim 1, wherein the belt drive system includes a first belt pulley driven by the first internal combustion drive engine, a second belt pulley driven by the second internal combustion drive engine, a third belt pulley connected to the milling drum, and at least one continuous drive belt engaging all three of the first, second and third belt pulleys, wherein:
step (c) further comprises adding together the first and second driving powers with the at least one continuous belt and transmitting the first and second driving powers to the milling drum with the at least one continuous belt.

3. The method of claim 2, further comprising;
tensioning the at least one continuous drive belt with an adjustable roller engaging the at least one continuous drive belt.

4. The method of claim 1 wherein step (c) further comprises;
transmitting the first driving power from the first internal combustion drive engine with a first drive belt; and
transmitting the second driving power from the second internal combustion drive engine with a second drive belt.

5. The method of claim 4, wherein:
at least one of the first and second drive belts drives the milling drum.

6. The method of claim 1 wherein step (c) further comprises:
adding together the first and second driving powers with a first drive belt extending between the first and second internal combustion drive engines; and
transmitting the combined first and second driving powers to the milling drum with a second drive belt extending between only one of the first and second internal combustion drive engines and the milling drum.

7. The method of claim 1, further comprising:
driving at least one hydraulic pump with the first internal combustion drive engine.

8. The method of claim 1, further comprising:
selectively disconnecting at least one of the drive engines from the belt drive system.

9. A method of driving a milling drum of a self-propelled civil engineering machine, the milling drum having a drum axis, the method comprising:
(a) operating a first internal combustion drive engine arranged on a frame of the machine transversely to a direction of travel of the machine, and thereby producing a first driving power;
(b) operating a second internal combustion engine arranged on the frame non-coaxial with the first engine and arranged next to the first engine in a plane lying above the drum axis, and thereby producing a second driving power; and
(c) transmitting the first and second driving powers to a milling drum of the machine with a belt drive system; and
(d) setting a crankshaft angle of the first engine relative to a crankshaft angle of the second engine and thereby at least partially cancelling rotary oscillations produced by the first engine with rotary oscillations produced by the second engine.

10. The method of claim 9, wherein:
step (c) further comprises using at least one continuous drive belt connected to both engines and the milling drum to transmit the first and second driving powers to the milling drum.

11. The method of claim 9, wherein:
step (c) further comprises using two drive belts extending over different paths to connect the two engines to the milling drum.

12. The method of claim 11, wherein:
step (c) further comprises connecting the two engines with one of the drive belts and connecting one of the engines to the milling drum with the other of the drive belts.

13. The method of claim 9, further comprising:
driving at least one hydraulic pump with one of the engines.

14. The method of claim 9, further comprising:
selectively disconnecting at least one of the drive engines from the belt drive system.

* * * * *